United States Patent
Zhao et al.

(10) Patent No.: US 12,133,250 B2
(45) Date of Patent: Oct. 29, 2024

(54) RESOURCE CONFIGURATION METHOD, RESOURCE OBTAINING METHOD, NETWORK DEVICE AND TERMINAL

(71) Applicant: DATANG MOBILE COMMUNICATIONS EQUIPMENT CO., LTD., Beijing (CN)

(72) Inventors: Yali Zhao, Beijing (CN); Pierre Bertrand, Beijing (CN); Jinhua Miao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 512 days.

(21) Appl. No.: 17/427,323

(22) PCT Filed: Jan. 13, 2020

(86) PCT No.: PCT/CN2020/071730
§ 371 (c)(1),
(2) Date: Jul. 30, 2021

(87) PCT Pub. No.: WO2020/156124
PCT Pub. Date: Aug. 6, 2020

(65) Prior Publication Data
US 2022/0124728 A1    Apr. 21, 2022

(30) Foreign Application Priority Data
Feb. 1, 2019 (CN) .......................... 201910103646.5

(51) Int. Cl.
*H04W 72/08* (2009.01)
*H04W 72/04* (2023.01)
(Continued)

(52) U.S. Cl.
CPC ..... *H04W 72/543* (2023.01); *H04W 72/0453* (2013.01); *H04W 72/20* (2023.01); *H04W 92/10* (2013.01)

(58) Field of Classification Search
CPC .......... H04W 72/543; H04W 72/0453; H04W 72/20; H04W 92/10; H04W 72/0446; H04W 76/27
See application file for complete search history.

(56) References Cited

U.S. PATENT DOCUMENTS 8,924,983 B2 * 12/2014 Zhu ....................... H04W 72/52
                                                       718/103
11,197,202 B2 * 12/2021 Samdanis ............. H04W 16/14
(Continued)

FOREIGN PATENT DOCUMENTS

WO    WO-2010/072162 A1    7/2010

OTHER PUBLICATIONS

Extended European Search Report dated Feb. 28, 2022 for Application No. EP 20749737.1.

*Primary Examiner* — Hoang-Chuong Q Vu
(74) *Attorney, Agent, or Firm* — Harness, Dickey & Pierce, P.L.C.

(57) ABSTRACT

The present disclosure provides a resource configuration method, a resource obtaining method, a network device and a terminal. The resource configuration method for the network device includes: obtaining a control information about a GCL; and configuring a preconfigured resource for an air interface for a terminal in accordance with the control information.

18 Claims, 5 Drawing Sheets

(51) Int. Cl.
    *H04W 72/0453*    (2023.01)
    *H04W 72/20*       (2023.01)
    *H04W 72/543*     (2023.01)
    *H04W 92/10*       (2009.01)

(56) References Cited

U.S. PATENT DOCUMENTS

| | | | |
|---|---|---|---|
| 11,832,123 | B2* | 11/2023 | Gangakhedkar ........ H04W 4/24 |
| 2010/0202493 | A1* | 8/2010 | Soliman ................. H04B 1/719 |
| | | | 375/E1.001 |
| 2011/0063975 | A1 | 3/2011 | Ohseki et al. |
| 2011/0113455 | A1* | 5/2011 | Wu ..................... H04L 12/2801 |
| | | | 370/235 |
| 2018/0255585 | A1* | 9/2018 | Tirronen ............. H04W 74/006 |
| 2020/0280872 | A1* | 9/2020 | Fiorani ................. H04W 28/24 |
| 2020/0383168 | A1* | 12/2020 | Nagasaka ......... H04W 52/0212 |
| 2021/0105654 | A1* | 4/2021 | Liu ..................... H04W 72/543 |
| 2021/0243771 | A1* | 8/2021 | Mannweiler ...... H04W 28/0268 |
| 2021/0306901 | A1* | 9/2021 | Mannweiler ............ H04L 45/02 |
| 2021/0400524 | A1* | 12/2021 | Kahn ....................... H04L 65/80 |
| 2022/0061063 | A1* | 2/2022 | Patel ................. H04W 72/1263 |

\* cited by examiner

RESOURCE CONFIGURATION METHOD, RESOURCE OBTAINING METHOD, NETWORK DEVICE AND TERMINAL

CROSS-REFERENCE TO RELATED APPLICATIONS

The present application is the U.S. national phase of PCT Application No. PCT/CN2020/071730 filed on Jan. 13, 2020, which claims a priority of the Chinese patent application 201910103646.5 filed on Feb. 1, 2019, which are incorporated herein by reference in their entirety.

TECHNICAL FIELD

The present disclosure relates to the field of communication technology, in particular to a resource configuration method, a resource obtaining method, a network device and a terminal.

BACKGROUND

In the related art, usually a network side device needs to configure a preconfigured resource for a terminal on the basis of report information from the terminal. When no report information is obtained from the terminal at an access network side, it is impossible to configure the preconfigured resource for the terminal.

SUMMARY

An object of the present disclosure is to provide a resource configuration method, a resource obtaining method, a network device and a terminal, so as to solve the problem in the related art where a preconfigured resource is configured on the basis of report information from the terminal and it is impossible for the network device to configure the preconfigured resource for the terminal when no report information is obtained from the terminal.

In one aspect, the present disclosure provides in some embodiments a resource configuration method for a network device, including: obtaining a control information about a Gate Control List (GCL); and configuring a preconfigured resource for an air interface for a terminal in accordance with the control information.

In some possible embodiments of the present disclosure, the obtaining the control information about the GCL includes one of: obtaining the control information about the GCL corresponding to a Quality of Service (QoS) flow or a Data Radio Bearer (DRB) through Centralized Network Configuration (CNC); or obtaining the control information about the GCL carried in a QoS parameter corresponding to the QoS flow or the DRB.

In some possible embodiments of the present disclosure, the control information includes at least one of: a start point and a length of a GCL time gate corresponding to the QoS flow or the DRB; a start point and an end point of the GCL time gate corresponding to the QoS flow or the DRB; a cycle time of the GCL time gate; or a data volume transmitted each time in the GCL time gate corresponding to the QoS flow or the DRB.

In some possible embodiments of the present disclosure, prior to configuring the preconfigured resource for the air interface for the terminal in accordance with the control information, the resource configuration method further includes mapping first services mapped to a same GCL time gate to a same QoS flow, and one QoS flow is mapped to a same DRB at the air interface.

In some possible embodiments of the present disclosure, the configuring the preconfigured resource for the air interface for the terminal in accordance with the control information includes one of: determining a time-domain position where the preconfigured resource is allowed to occur in accordance with a start point and a length of a GCL time gate corresponding to a QoS flow or a DRB; determining the time-domain position where the preconfigured resource is allowed to occur in accordance with the start point and an end point of the GCL time gate corresponding to the QoS flow or the DRB; determining a period of the preconfigured resource in accordance with a GCL cycle time; determining a time-domain resource corresponding to the preconfigured resource in accordance with a data volume transmitted each time in the GCL time gate corresponding to the QoS flow or the DRB; or determining a frequency-domain resource corresponding to the preconfigured resource in accordance with the data volume transmitted each time in the GCL time gate corresponding to the QoS flow or the DRB.

In some possible embodiments of the present disclosure, the configuring the preconfigured resource for the air interface for the terminal in accordance with the control information includes configuring at least one set of preconfigured resources for the terminal with respect to each GCL time gate, and the set of preconfigured resources is a set of physical resources occupying a same frequency-domain position and occurring repeatedly at a time domain in accordance with a predetermined period.

In some possible embodiments of the present disclosure, the configuring the at least one set of preconfigured resources for the terminal with respect to each GCL time gate includes configuring the preconfigured resources for the terminal through Radio Resource Control (RRC) signaling, and the RRC signaling carries at least one of an index number of each preconfigured resource, a period of each preconfigured resource, a time-domain position of each preconfigured resource, a frequency-domain position of each preconfigured resource, or a Radio Network Temporary Identifier (RNTI) corresponding to each preconfigured resource.

In some possible embodiments of the present disclosure, when there is more than one set of preconfigured resources, the RRC signaling further carries at least one of the quantity of times for which the preconfigured resource is repeated, a time offset parameter for each repetition, or a frequency-domain offset parameter for each repetition.

In some possible embodiments of the present disclosure, the configuring the at least one set of preconfigured resources for the terminal with respect to each GCL time gate includes configuring the preconfigured resources through RRC signaling, and activating and/or deactivating the preconfigured resources through Physical Downlink Control Channel (PDCCH) signaling, the RRC signaling carries at least one of an index number of each preconfigured resource, a period of each preconfigured resource, and an RNTI corresponding to each preconfigured resource, and the PDCCH signaling carries at least one of the index number of each preconfigured resource, a time-domain position of each preconfigured resource, or a frequency-domain position of each preconfigured resource.

In some possible embodiments of the present disclosure, when there is more than one set of preconfigured resources, the RRC signaling or the PDCCH signaling further carries at least one of the quantity of times for which the preconfigured resource is repeated, a time offset parameter for each repetition, or a frequency-domain offset parameter for each repetition.

In some possible embodiments of the present disclosure, the configuring the preconfigured resource for the air interface for the terminal in accordance with the control information includes configuring a logical channel prioritization restriction parameter corresponding to a logic channel for the terminal through RRC signaling, and the logical channel prioritization restriction parameter at least includes at least one of an index number of the preconfigured resource, a GCL time gate, or a GCL cycle time.

In another aspect, the present disclosure provides in some embodiments a resource obtaining method for a terminal, including obtaining a preconfigured resource for an air interface configured by a network device, and the preconfigured resource is configured by the network device in accordance with control information about a GCL.

In some possible embodiments of the present disclosure, the obtaining the preconfigured resource for the air interface configured by the network device includes obtaining a logical channel prioritization restriction parameter corresponding to a logic channel configured by the network device for the terminal through RRC signaling, and the logical channel prioritization restriction parameter at least includes at least one of an index number of the preconfigured resource, a GCL time gate, or a GCL cycle time.

In some possible embodiments of the present disclosure, subsequent to obtaining the logical channel prioritization restriction parameter corresponding to the logic channel configured by the network device for the terminal through the RRC signaling, the resource obtaining method further includes determining a mapping between the logic channel and the preconfigured resource in accordance with the logical channel prioritization restriction parameter configured by the network device for the terminal.

In yet another aspect, the present disclosure provides in some embodiments a network device, including a memory, a processor, and a computer program stored in the memory and executed by the processor. The processor is configured to execute the computer program so as to: obtain a control information about a GCL; and configure a preconfigured resource for an air interface for a terminal in accordance with the control information.

In some possible embodiments of the present disclosure, the processor is configured to execute the computer program so as to perform one of: obtaining the control information about the GCL corresponding to a QoS flow or a DRB through CNC; or obtaining the control information about the GCL carried in a QoS parameter corresponding to the QoS flow or the DRB.

In some possible embodiments of the present disclosure, the control information includes at least one of: a start point and a length of a GCL time gate corresponding to the QoS flow or the DRB; a start point and an end point of the GCL time gate corresponding to the QoS flow or the DRB; a cycle time of the GCL time gate; or a data volume transmitted each time in the GCL time gate corresponding to the QoS flow or the DRB.

In some possible embodiments of the present disclosure, the processor is further configured to execute the computer program, so as to map first services mapped to a same GCL time gate to a same QoS flow, and one QoS flow is mapped to a same DRB at the air interface.

In some possible embodiments of the present disclosure, the processor is further configured to execute the computer program, so as to perform one of: determining a time-domain position where the preconfigured resource is allowed to occur in accordance with a start point and a length of a GCL time gate corresponding to a QoS flow or a DRB; determining the time-domain position where the preconfigured resource is allowed to occur in accordance with the start point and an end point of the GCL time gate corresponding to the QoS flow or the DRB; determining a period of the preconfigured resource in accordance with a GCL cycle time; determining a time-domain resource corresponding to the preconfigured resource in accordance with a data volume transmitted each time in the GCL time gate corresponding to the QoS flow or the DRB; or determining a frequency-domain resource corresponding to the preconfigured resource in accordance with the data volume transmitted each time in the GCL time gate corresponding to the QoS flow or the DRB.

In some possible embodiments of the present disclosure, the processor is further configured to execute the computer program, so as to configure at least one set of preconfigured resources for the terminal with respect to each GCL time gate, and the set of preconfigured resources is a set of physical resources occupying a same frequency-domain position and occurring repeatedly at a time domain in accordance with a predetermined period.

In some possible embodiments of the present disclosure, the processor is further configured to execute the computer program, so as to configure the preconfigured resources for the terminal through RRC signaling, and the RRC signaling carries at least one of an index number of each preconfigured resource, a period of each preconfigured resource, a time-domain position of each preconfigured resource, a frequency-domain position of each preconfigured resource, or an RNTI corresponding to each preconfigured resource.

In some possible embodiments of the present disclosure, when there is more than one set of preconfigured resources, the RRC signaling further carries at least one of the quantity of times for which the preconfigured resource is repeated, a time offset parameter for each repetition, or a frequency-domain offset parameter for each repetition.

In some possible embodiments of the present disclosure, the processor is further configured to execute the computer program, so as to configure the preconfigured resources through RRC signaling, and activate and/or deactivate the preconfigured resources through PDCCH signaling, the RRC signaling carries at least one of an index number of each preconfigured resource, a period of each preconfigured resource, or an RNTI corresponding to each preconfigured resource, and the PDCCH signaling carries at least one of the index number of each preconfigured resource, a time-domain position of each preconfigured resource, or a frequency-domain position of each preconfigured resource.

In some possible embodiments of the present disclosure, when there is more than one set of preconfigured resources, the RRC signaling or the PDCCH signaling further carries at least one of the quantity of times for which the preconfigured resource is repeated, a time offset parameter for each repetition, or a frequency-domain offset parameter for each repetition.

In some possible embodiments of the present disclosure, the processor is further configured to execute the computer program, so as to configure a logical channel prioritization restriction parameter corresponding to a logic channel for the terminal through RRC signaling, and the logical channel prioritization restriction parameter at least includes at least one of an index number of the preconfigured resource, a GCL time gate, or a GCL cycle time.

In still yet another aspect, the present disclosure provides in some embodiments a terminal, including a memory, a processor, and a computer program stored in the memory and executed by the processor. The processor is configured to execute the computer program so as to obtain a preconfigured resource for an air interface configured by a network device, and the preconfigured resource is configured by the network device in accordance with control information about a GCL.

In some possible embodiments of the present disclosure, the processor is further configured to execute the computer program, so as to obtain a logical channel prioritization restriction parameter corresponding to a logic channel configured by the network device for the terminal through RRC signaling, and the logical channel prioritization restriction parameter at least includes at least one of an index number of the preconfigured resource, a GCL time gate, or a GCL cycle time.

In some possible embodiments of the present disclosure, the processor is further configured to execute the computer program, so as to determine a mapping between the logic channel and the preconfigured resource in accordance with the logical channel prioritization restriction parameter configured by the network device for the terminal.

In still yet another aspect, the present disclosure provides in some embodiments a computer-readable storage medium storing therein a computer program. The computer program is executed by a processor so as to implement the above-mentioned resource configuration method or resource obtaining method.

In still yet another aspect, the present disclosure provides in some embodiments a network device, including: a first obtaining module configured to obtain a control information about a GCL; and a configuration module configured to configure a preconfigured resource for an air interface for a terminal in accordance with the control information.

In still yet another aspect, the present disclosure provides in some embodiments a terminal, including a second obtaining module configured to obtain a preconfigured resource for an air interface configured by a network device, and the preconfigured resource is configured by the network device in accordance with control information about a GCL.

The present disclosure has the following beneficial effect.

According to the embodiments of the present disclosure, the preconfigured resource for the air interface is configured for the terminal directly in accordance with the control information about the GCL, so it is able to reduce an overhead of the terminal for reporting preconfigured resource-related auxiliary information, thereby to increase a system capacity.

DETAILED DESCRIPTION

In order to make the objects, the technical solutions and the advantages of the present disclosure more apparent, the present disclosure will be described hereinafter in a clear and complete manner in conjunction with the drawings and embodiments.

At first, some concepts in the embodiments of the present disclosure will be described hereinafter.

1) Scheduling Mode of Preconfigured Resource
  I. A New Radio (NR) system supports two scheduling modes, i.e., preconfigured resource and dynamic scheduling, which will be briefly introduced hereinafter.
1. Preconfigured Resource The preconfigured resource refers to a resource pre-allocated by a network side to a terminal without dynamic scheduling. The NR system supports the preconfigured resource in both downlink (DL) and uplink (UL).

A downlink preconfigured resource in the NR system is called as Semi-Persistent Scheduling (SPS) resource. The so-called SPS refers to a situation where the network side configures such information as an RNTI and a period corresponding to the SPS resource through RRC signaling. A base station activates a downlink SPS resource through PDCCH signaling subsequently, and such information as a time/frequency-domain position of the downlink preconfigured resource is carried in a PDCCH.

Figure 1:
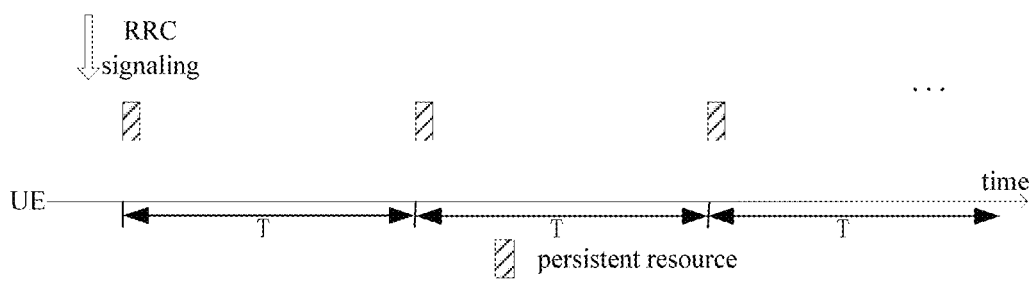
FIG. 1 is a schematic view showing a configured grant type 1.
Figure 2:
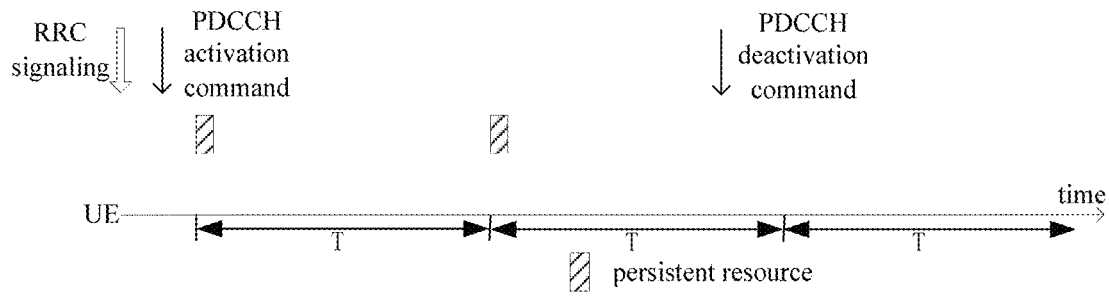
FIG. 2 is a schematic view showing a configured grant type 2.

The allocation of an uplink preconfigured resource in the NR system includes two types, i.e., configured grant Type 1 and configured grant Type 2. The configured grant Type 1 refers to a situation where the base station allocates a specific uplink resource, including a resource period, a corresponding Configured Scheduling RNTI (CS-RNTI), a time/frequency resource position, a specific transmission format (e.g., Modulation and Coding Scheme (MCS)), etc., for the terminal through RRC signaling, and the terminal obtains a periodic uplink transmission resource in accordance with the configuration information and transmits uplink data immediately in accordance with the allocated periodic uplink transmission resource. In logic channel configuration, whether a logic channel is capable of using a resource with the configured grant Type 1 is also configured, as shown in FIG. 1. The configured grant Type 2 refers to a situation where the base station allocates the period and the CS-RNTI for the periodic uplink transmission resource for the terminal through the RRC signaling, and the base station activates or deactivates the preconfigured resource with the configured grant Type 2 through a PDCCH command. The PDCCH command used by the base station to activate the configured grant Type 2 indicate a specific transmission resource, including a time/frequency resource, a transmission format, etc., as shown in FIG. 2.

2. Dynamic Scheduling

The dynamic scheduling refers to single resource allocation performed by the base station for the terminal using the PDCCH command. In the uplink dynamic scheduling, the terminal parses the time-frequency resource position and the transmission format indicated in the PDCCH command, and transmits the uplink data in a specified transmission format at the time-frequency resource position.

In Long Term Evolution (LTE) and NR Rel-15, the dynamic scheduling always prioritizes the allocation of the preconfigured grant resource. This is because, It is generally recognized that, there should be a reason for the base station to perform the dynamic scheduling for the terminal when there is a preconfigured resource for a User Equipment (UE, also called as terminal), and the dynamic scheduling should be controlled by the base station.

II. IEEE 802.1Qcc/802.1Qbv $5^{th}$-Generation (5G) New Radio (NR) supports a Time Sensitive Network (TSN). In order to ensure a service delay, the data transmission is performed using a scheduling mode of the preconfigured resource. The data transmission at a TSN service layer is performed on the basis of IEEE 802.1.

Figure 3:
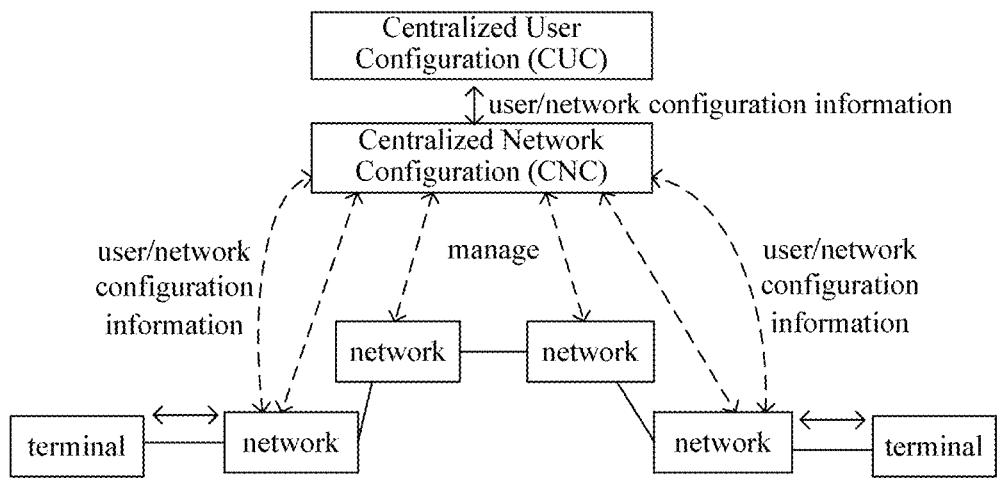
FIG. 3 is a schematic view showing an implementation mode of a network configuration defined in 802.1Qcc.

IEEE 802.1Qcc is a stream reservation protocol defined by the IEEE, and an implementation mode of a network configuration in IEEE 802.1Qcc is shown in FIG. 3. In FIG. 3, a CNC function takes charge of configuring user-related and network-related configuration information.

Figure 4:
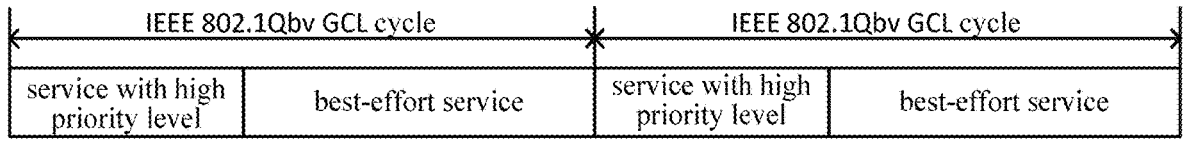
FIG. 4 is a schematic view showing a scheduling mode of a data frame in 802.1Qbv.

The scheduling of a TSN service data frame is performed on the basis of IEEE 802.1Qbv (stream reservation protocol), and its core concept lies in that the data transmission is performed on the basis of a GCL. To be specific, as shown in FIG. 4, the data frame is shaped to form different queues, and data in each queue is merely allowed to be transmitted within a specific time window corresponding to the queue.

However, there is publicly no definite scheme about how to configure the preconfigured resource at an air interface to match a transmission characteristic of the TSN service data.

In addition, in the related art, the configuration of the preconfigured resource depends on report information from the terminal, and when the network device fails to obtain the report information from the terminal, it is impossible to configure the preconfigured resource.

An object of the present disclosure is to provide a resource configuration method, a resource obtaining method, a network device and a terminal, so as to solve the above-mentioned problems.

Figure 5:
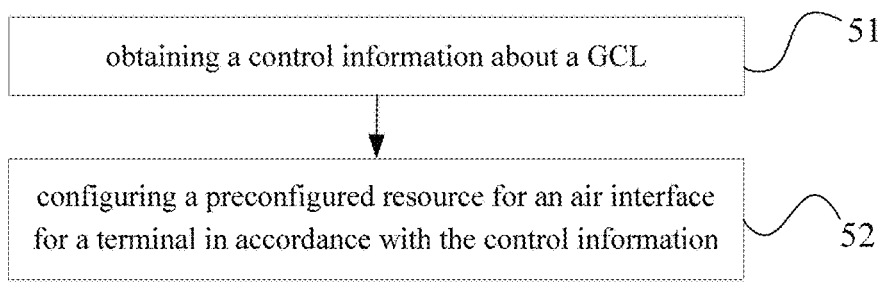
FIG. 5 is a flow chart of a resource configuration method according to one embodiment of the present disclosure.

As shown in FIG. 5, the present disclosure provides in some embodiments a resource configuration method for a network device, which includes the following steps.

Step 51: obtaining a control information about a GCL.

It should be appreciated that, the control information includes at least one of: (A11) a start point and a length of a GCL time gate corresponding to a QoS flow or a DRB; (A12) a start point and an end point of the GCL time gate corresponding to the QoS flow or the DRB; (A13) a cycle time of the GCL time gate; or (A14) a data volume transmitted each time in the GCL time gate corresponding to the QoS flow or the DRB.

Step 52: configuring a preconfigured resource for an air interface for a terminal in accordance with the control information.

It should be appreciated that, the preconfigured resource includes an uplink preconfigured resource and/or a downlink preconfigured resource.

It should be further appreciated that, the network device obtains the control information about the GCL in one of the following two modes.

First mode: the control information about the GCL corresponding to a QoS flow or a DRB is obtained through CNC.

Second mode: the control information about the GCL carried in a QoS parameter corresponding to the QoS flow or the DRB is obtained.

To be specific, the configuring, by the network device, the preconfigured resource includes at least one of the followings.

B11: determining a time-domain position where the preconfigured resource is allowed to occur in accordance with a start point and a length of a GCL time gate corresponding to a QoS flow or a DRB.

B12: determining the time-domain position where the preconfigured resource is allowed to occur in accordance with the start point and an end point of the GCL time gate corresponding to the QoS flow or the DRB.

It should be appreciated that, in the above two modes, the time-domain position where the preconfigured resource is allowed to occur, i.e., a specific time-domain position of the preconfigured resource, is determined.

B13: determining a period of the preconfigured resource in accordance with a GCL cycle time.

B14: determining a time-domain resource corresponding to the preconfigured resource in accordance with a data volume transmitted each time in the GCL time gate corresponding to the QoS flow or the DRB.

B15: determining a frequency-domain resource corresponding to the preconfigured resource in accordance with the data volume transmitted each time in the GCL time gate corresponding to the QoS flow or the DRB.

It should be further appreciated that, the preconfigured resource is configured in accordance with the control information about the GCL, so the specific ones of B11 to B15 to be configured by the network device is determined in accordance with the control information about the GCL. For example, when the control information about the GCL includes A11, A13 and A14, behaviors of the network device during the configuration of the preconfigured resource are B11, B13, B14 and B15, and when the control information about the GCL includes A12, A13 and A15, behaviors of the network device during the configuration of the preconfigured resource are B12, B13, B14 and B15.

It should be appreciated that, prior to configuring the preconfigured resource for the terminal, the network device needs to determine a mapping between the preconfigured resource and any of a service, a QoS flow and a DRB. To be specific, prior to Step 52, the resource configuration method further includes mapping first services mapped to a same GCL time gate to a same QoS flow.

It should be appreciated that, the first service refers to a periodic service with a fixed data packet size. For example, the first service is a periodic TSN service with a fixed data packet size, and one QoS flow is mapped to a same DRB at the air interface.

To be specific, it should be appreciated that, the network device configures the preconfigured resource for the air interface for the terminal mainly through configuring at least one set of preconfigured resources for the terminal with respect to each GCL time gate.

It should be appreciated that, the set of preconfigured resources is a set of physical resources occupying a same frequency-domain position and occurring repeatedly at a time domain in accordance with a predetermined period.

To be specific, when the configured resource is an uplink preconfigured resource with a configured grant Type 1, the configuring the at least one set of preconfigured resources for the terminal with respect to each GCL time gate specifically includes configuring the preconfigured resources for the terminal through RRC signaling.

It should be appreciated that, the RRC signaling carries at least one of an index number of each preconfigured resource, a period of each preconfigured resource, a time-domain position of each preconfigured resource, a frequency-domain position of each preconfigured resource, or an RNTI corresponding to each preconfigured resource.

It should be further appreciated that, in this case, when there is merely one set of preconfigured resources configured by the network device, the RRC signaling merely needs to carry the above information. However, in order to prevent the occurrence of service data jitter, usually a plurality of sets of preconfigured resources (i.e., at least two sets of preconfigured resources) is configured by the network device for the terminal. In this case, in order to ensure the terminal to know exactly a specific distribution of the sets of preconfigured resources, the RRC signaling further carries at least one of the quantity of times for which the preconfigured resource is repeated, a time offset parameter for each repetition, or a frequency-domain offset parameter for each repetition.

To be specific, when the preconfigured resource is an uplink preconfigured resource with the configured grant Type 2 or a downlink preconfigured resource, the configuring the at least one set of preconfigured resources for the terminal with respect to each GCL time gate specifically includes configuring the preconfigured resources through RRC signaling, and activating and/or deactivating the preconfigured resources through PDCCH signaling. The RRC signaling carries at least one of an index number of each preconfigured resource, a period of each preconfigured resource, and an RNTI corresponding to each preconfigured resource, and the PDCCH signaling carries at least one of the index number of each preconfigured resource, a time-domain position of each preconfigured resource, or a frequency-domain position of each preconfigured resource.

It should be further appreciated that, in this case, when there is merely one set of preconfigured resources configured by the network device, the RRC signaling merely needs to carry the above information. However, in order to prevent the occurrence of service data jitter, usually a plurality of sets of preconfigured resources (i.e., at least two sets of preconfigured resources) is configured by the network device for the terminal. In this case, in order to ensure the terminal to know exactly a specific distribution of the sets of preconfigured resources, the RRC signaling or the PDCCH signaling further carries at least one of the quantity of times for which the preconfigured resource is repeated, a time offset parameter for each repetition, or a frequency-domain offset parameter for each repetition.

Further, in order to ensure that the DRB is capable of using the preconfigured resource configured with respect to the DRB during Logical Channel Prioritization (LCP) performed by the terminal, the network device needs to configure an LCP restriction parameter corresponding to a logical channel for the terminal through the RRC signaling.

The logical channel prioritization restriction parameter at least includes at least one of (C11) an index number of the preconfigured resource, (C12) a GCL time gate, or (C13) a GCL cycle time.

The terminal determines a mapping between the logical channel and the preconfigured resource in accordance with the LCP restriction parameter, so as to perform the data transmission.

Detailed description will be given hereinafter in conjunction with actual applications.

First circumstance: the control information about the GCL corresponding to the QoS flow or the DRB is obtained through the CNC, so as to configure the downlink preconfigured resource.

For the downlink preconfigured resource, the network device obtains the control information about the GCL corresponding to a downlink QoS flow or a DRB through the CNC, and the control information about the GCL includes, but not limited to, one of (S11) a start point and a length of a GCL time gate corresponding to the QoS flow or the DRB, (S12) a start point and an end point of the GCL time gate corresponding to the QoS flow or the DRB, (S13) a GCL cycle time, or (S14) a data volume transmitted each time in the GCL time gate corresponding to the QoS flow or the DRB, or a combination thereof.

When the preconfigured resource for the air interface is configured by a scheduling device at a radio access network side in accordance with the control information about the GCL, a mapping between the preconfigured resource and a service/QoS flow/DRB is as follows: a periodic service mapped to a same GCL time gate and having a fixed data packet size is mapped to a same QoS flow, and one QoS flow is mapped to a same DRB at the air interface.

Next, the network device configures the downlink preconfigured resource for the terminal in accordance with the control information about the GCL, specifically through at least one of: S15 of determining a time-domain position where the preconfigured resource is allowed to occur in accordance with a start point and a length of a GCL time gate corresponding to a QoS flow or a DRB (there is a mapping between the QoS flow and the DRB); S16 of determining the time-domain position where the preconfigured resource is allowed to occur in accordance with the start point and an end point of the GCL time gate corresponding to the QoS flow or the DRB; S17 of determining a period of the preconfigured resource in accordance with a GCL cycle time; or S18 of determining a time-domain resource and/or a frequency-domain resource corresponding to the preconfigured resource in accordance with a data volume transmitted each time in the GCL time gate corresponding to the QoS flow or the DRB.

Figure 6:
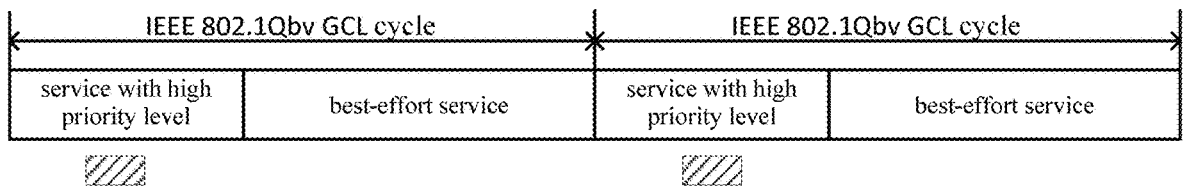
FIG. 6 is a schematic view showing a configuration effect of a downlink preconfigured resource.

As shown in FIG. 6, a box filled with slashes represents the configured downlink preconfigured resource corresponding to a service with a high priority level.

Figure 7:
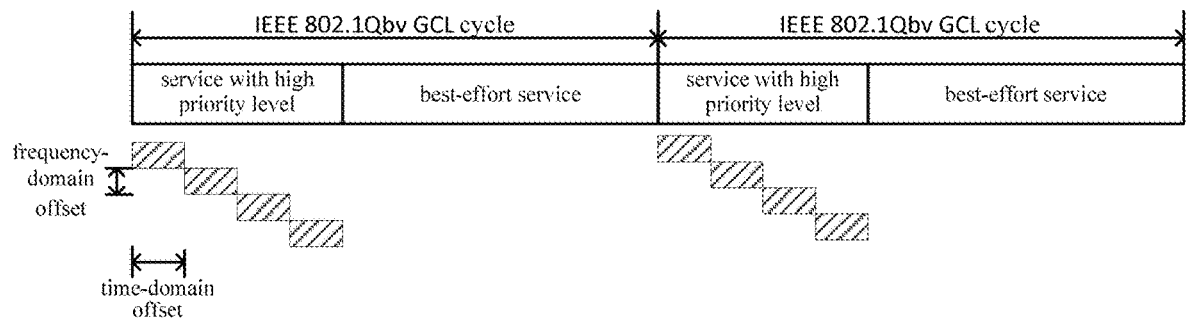
FIG. 7 is another schematic view showing the configuration effect of the downlink preconfigured resource.

In order to prevent the occurrence of service data jitter, for optimization, the downlink preconfigured resource is configured as follows. Apart from existing parameters, the RRC signaling corresponding to the downlink preconfigured resource or the PDCCH signaling for activating the preconfigured resource additionally includes the quantity N of times for which the preconfigured resource is repeated, and a time offset parameter and a frequency-domain offset parameter for each repetition, so as to achieve an effect of the preconfigured resource as shown in FIG. 7. A box with slashes represents the configured downlink preconfigured resource corresponding to a service with a high priority level, i.e., four sets of downlink preconfigured resources are configured for the service with the high priority level.

In order to ensure that the preconfigured resource is capable of being utilized appropriately, for the downlink, when organizing a Media Access Control (MAC) Packet Data Unit (PDU) corresponding to the preconfigured resource, the network device needs to determine the DRB capable of using the preconfigured resource in accordance with the GCL time gate where the preconfigured resource is located and the GCL cycle time.

Second circumstance: the control information about the GCL corresponding to the QoS flow or the DRB is obtained through the CNC, so as to configure the uplink preconfigured resource.

For the uplink preconfigured resource, the network device obtains the control information about the GCL corresponding an uplink QoS flow/DRB through the CNC, and the control information about the GCL includes, but not limited to, one of (S21) a start point and a length of a GCL time gate corresponding to the QoS flow or the DRB, (S22) a start point and an end point of the GCL time gate corresponding to the QoS flow or the DRB, (S23) a GCL cycle time, or (S24) a data volume transmitted each time in the GCL time gate corresponding to the QoS flow or the DRB, or a combination thereof.

When the preconfigured resource for the air interface is configured by the scheduling device at the radio access network side in accordance with the control information about the GCL, a mapping between the preconfigured resource and a service/QoS flow/DRB is as follows: a periodic service mapped to a same GCL time gate and having a fixed data packet size is mapped to a same QoS flow, and one QoS flow is mapped to a same DRB at the air interface.

Next, the network device configures the downlink preconfigured resource for the terminal in accordance with the control information about the GCL, specifically through at least one of: S25 of determining a time-domain position where the preconfigured resource is allowed to occur in accordance with a start point and a length of a GCL time gate corresponding to a QoS flow or a DRB (there is a mapping between the QoS flow and the DRB); S26 of determining the time-domain position where the preconfigured resource is allowed to occur in accordance with the start point and an end point of the GCL time gate corresponding to the QoS flow or the DRB; S27 of determining a period of the preconfigured resource in accordance with a GCL cycle time; or S28 of determining a time-domain resource and/or a frequency-domain resource corresponding to the preconfigured resource in accordance with a data volume transmitted each time in the GCL time gate corresponding to the QoS flow or the DRB.

Figure 8:
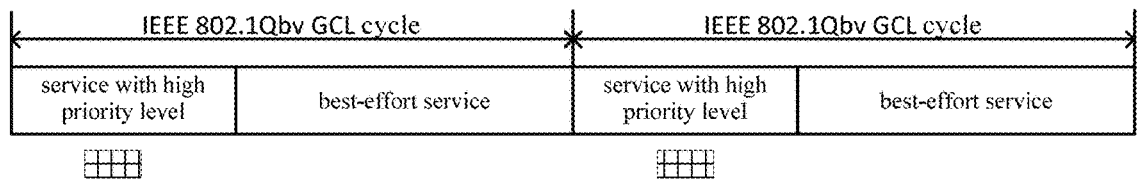
FIG. 8 is a schematic view showing a configuration effect of an uplink preconfigured resource.

As shown in FIG. 8, a box filled with slashes represents the configured uplink preconfigured resource corresponding to a service with a high priority level.

In order to prevent the occurrence of service data jitter, for optimization, the uplink preconfigured resource is configured as follows.

For the uplink preconfigured resource with the Type 1, apart from existing parameters, the RRC signaling corresponding to the preconfigured resource additionally includes one of the quantity N of times for which the preconfigured resource is repeated, and a time offset parameter and a frequency-domain offset parameter for each repetition.

Figure 9:
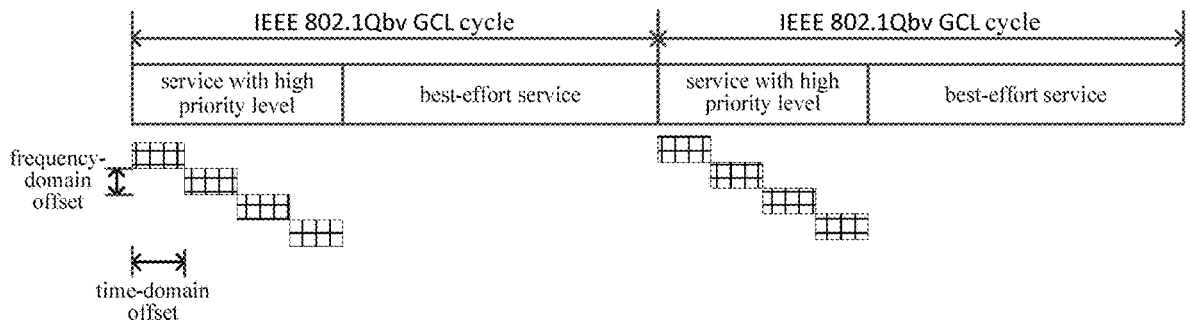
FIG. 9 is another schematic view showing the configuration effect of the uplink preconfigured resource.

For the uplink preconfigured resource with the Type 2, apart from existing parameters, the RRC signaling corresponding to the preconfigured resource or the PDCCH signaling for activating the preconfigured resource additionally includes one of the quantity N of times for which the preconfigured resource is repeated, and a time offset parameter and a frequency-domain offset parameter for each repetition, so as to achieve an effect of the preconfigured resource as shown in FIG. 9. A box with slashes represents the configured uplink preconfigured resource corresponding to a service with a high priority level, i.e., four sets of downlink preconfigured resources are configured for the service with the high priority level.

Further, for the uplink, in order to ensure that the DRB is capable of using the preconfigured resource configured with respect to the DRB during LCP performed by the terminal, the network device configures an LCP restriction parameter corresponding to a logical channel for the terminal through the RRC signaling. The logical channel prioritization restriction parameter includes at least one of an index number of the preconfigured resource, a GCL time gate, or a GCL cycle time.

Third circumstance: the control information about the GCL is obtained through a QoS parameter of the QoS flow/DRB, so as to configure the downlink preconfigured resource.

For the downlink preconfigured resource, the network device obtains the control information about the GCL corresponding to a downlink QoS flow or a DRB through the CNC, and the control information about the GCL includes, but not limited to, one of (S31) a start point and a length of a GCL time gate corresponding to the QoS flow or the DRB, (S32) a start point and an end point of the GCL time gate corresponding to the QoS flow or the DRB, (S33) a GCL cycle time, or (S34) a data volume transmitted each time in the GCL time gate corresponding to the QoS flow or the DRB, or a combination thereof.

When the preconfigured resource for the air interface is configured by a scheduling device at a radio access network side in accordance with the control information about the GCL, a mapping between the preconfigured resource and a service/QoS flow/DRB is as follows: a periodic service mapped to a same GCL time gate and having a fixed data packet size is mapped to a same QoS flow, and one QoS flow is mapped to a same DRB at the air interface.

Next, the network device configures the downlink preconfigured resource for the terminal in accordance with the control information about the GCL, specifically through at least one of: S35 of determining a time-domain position where the preconfigured resource is allowed to occur in accordance with a start point and a length of a GCL time gate corresponding to a QoS flow or a DRB (there is a mapping between the QoS flow and the DRB); S36 of determining the time-domain position where the preconfigured resource is allowed to occur in accordance with the start point and an end point of the GCL time gate corresponding to the QoS flow or the DRB; S37 of determining a period of the preconfigured resource in accordance with a GCL cycle time; or S38 of determining a time-domain resource and/or a frequency-domain resource corresponding to the preconfigured resource in accordance with a data volume transmitted each time in the GCL time gate corresponding to the QoS flow or the DRB.

FIG. 6 shows a specific configuration.

In order to prevent the occurrence of service data jitter, for optimization, the downlink preconfigured resource is configured as follows. Apart from existing parameters, the RRC signaling corresponding to the downlink preconfigured resource or the PDCCH signaling for activating the preconfigured resource additionally includes the quantity N of times for which the preconfigured resource is repeated, and a time offset parameter and a frequency-domain offset parameter for each repetition, so as to achieve an effect of the preconfigured resource as shown in FIG. 7.

In order to ensure that the preconfigured resource is capable of being utilized appropriately, for the downlink, when organizing an MAC PDU corresponding to the preconfigured resource, the network device needs to determine the DRB capable of using the preconfigured resource in accordance with the GCL time gate where the preconfigured resource is located and the GCL cycle time.

Fourth circumstance: the control information about the GCL corresponding to the QoS flow or the DRB is obtained through the CNC, so as to configure the uplink preconfigured resource.

For the uplink preconfigured resource, the network device obtains the control information about the GCL corresponding an uplink QoS flow/DRB through the CNC, and the control information about the GCL includes, but not limited to, one of (S41) a start point and a length of a GCL time gate corresponding to the QoS flow or the DRB, (S42) a start point and an end point of the GCL time gate corresponding to the QoS flow or the DRB, (S43) a GCL cycle time, or (S44) a data volume transmitted each time in the GCL time gate corresponding to the QoS flow or the DRB, or a combination thereof.

When the preconfigured resource for the air interface is configured by the scheduling device at the radio access network side in accordance with the control information about the GCL, a mapping between the preconfigured resource and a service/QoS flow/DRB is as follows: a periodic service mapped to a same GCL time gate and having a fixed data packet size is mapped to a same QoS flow, and one QoS flow is mapped to a same DRB at the air interface.

Next, the network device configures the downlink preconfigured resource for the terminal in accordance with the control information about the GCL, specifically through at least one of: S45 of determining a time-domain position where the preconfigured resource is allowed to occur in accordance with a start point and a length of a GCL time gate corresponding to a QoS flow or a DRB (there is a mapping between the QoS flow and the DRB); S46 of determining the time-domain position where the preconfigured resource is allowed to occur in accordance with the start point and an end point of the GCL time gate corresponding to the QoS flow or the DRB; S47 of determining a period of the preconfigured resource in accordance with a GCL cycle time; or S48 of determining a time-domain resource and/or a frequency-domain resource corresponding to the preconfigured resource in accordance with a data volume transmitted each time in the GCL time gate corresponding to the QoS flow or the DRB.

FIG. 8 shows a specific configuration.

In order to prevent the occurrence of service data jitter, for optimization, the uplink preconfigured resource is configured as follows.

For the uplink preconfigured resource with the Type 1, apart from the existing parameters, the RRC signaling corresponding to the preconfigured resource additionally includes one of the quantity N of times for which the preconfigured resource is repeated, and a time offset parameter and a frequency-domain offset parameter for each repetition.

For the uplink preconfigured resource with the Type 2, apart from existing parameters, the RRC signaling corresponding to the preconfigured resource or the PDCCH signaling for activating the preconfigured resource additionally includes one of the quantity N of times for which the preconfigured resource is repeated, and a time offset parameter and a frequency-domain offset parameter for each repetition, so as to achieve an effect of the preconfigured resource as shown in FIG. 9.

Further, for the uplink, in order to ensure that the DRB is capable of using the preconfigured resource configured with respect to the DRB during LCP performed by the terminal, the network device configures an LCP restriction parameter corresponding to a logical channel for the terminal through the RRC signaling. The logical channel prioritization restriction parameter includes at least one of an index number of the preconfigured resource, a GCL time gate, or a GCL cycle time.

It should be appreciated that, according to the embodiments of the present disclosure, the preconfigured resource for the air interface is configured for the terminal directly in accordance with the control information about the GCL, so it is able to reduce an overhead of the terminal for reporting preconfigured resource-related auxiliary information, thereby to increase a system capacity. In addition, the control information about the GCL reflects the scheduling of a service data frame (e.g., a TSN service data frame), so it is able to ensure that the preconfigured resource is capable of matching a service data arrival situation, thereby to reduce a data transmission delay and meet a QoS requirement on the service.

Figure 10:
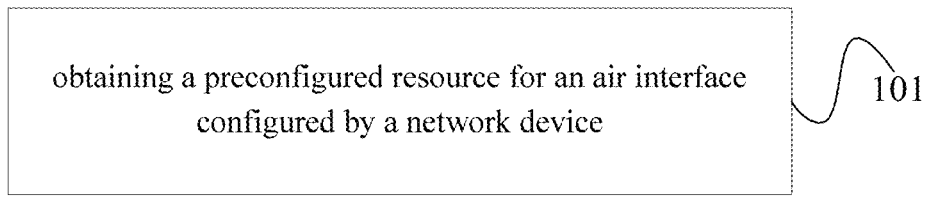
FIG. 10 is a flow chart of a resource obtaining method according to one embodiment of the present disclosure.

As shown in FIG. 10, the present disclosure provides in some embodiments a resource obtaining method for a terminal, including Step 101 of obtaining a preconfigured resource for an air interface configured by a network device. The preconfigured resource is configured by the network device in accordance with control information about a GCL.

In a possible embodiment of the present disclosure, the obtaining the preconfigured resource for the air interface configured by the network device includes obtaining a logical channel prioritization restriction parameter corresponding to a logic channel configured by the network device for the terminal through RRC signaling, and the logical channel prioritization restriction parameter at least includes at least one of an index number of the preconfigured resource, a GCL time gate, or a GCL cycle time.

In a possible embodiment of the present disclosure, subsequent to obtaining the logical channel prioritization restriction parameter corresponding to the logic channel configured by the network device for the terminal through the RRC signaling, the resource obtaining method further includes determining a mapping between the logic channel and the preconfigured resource in accordance with the logical channel prioritization restriction parameter configured by the network device for the terminal.

The above-mentioned description about the terminal is adapted to the embodiments about the resource obtaining method for the terminal, with a same technical effect.

Figure 11:
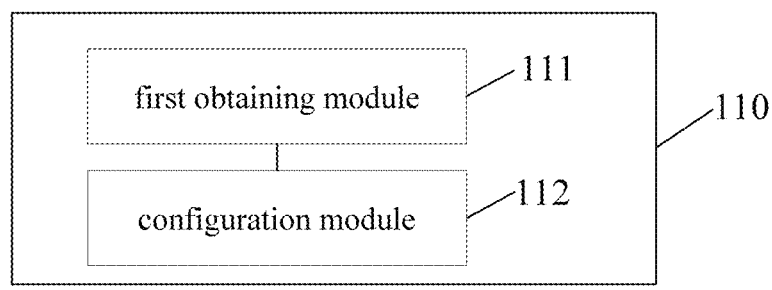
FIG. 11 is a schematic view showing modules of a network device according to one embodiment of the present disclosure.

As shown in FIG. 11, the present disclosure provides in some embodiments a network device 110, which includes: a first obtaining module 111 configured to obtain a control information about a GCL; and a configuration module 112 configured to configure a preconfigured resource for an air interface for a terminal in accordance with the control information.

In a possible embodiment of the present disclosure, when obtaining the control information about the GCL, the first obtaining module 111 is further configured to perform at least one of: obtaining the control information about the GCL corresponding to a QoS flow or a DRB through CNC; and obtaining the control information about the GCL carried in a QoS parameter corresponding to the QoS flow or the DRB.

To be specific, the control information includes at least one of: a start point and a length of a GCL time gate corresponding to the QoS flow or the DRB; a start point and an end point of the GCL time gate corresponding to the QoS flow or the DRB; a cycle time of the GCL time gate; or a data volume transmitted each time in the GCL time gate corresponding to the QoS flow or the DRB.

In a possible embodiment of the present disclosure, prior to configuring the preconfigured resource for the air interface for the terminal in accordance with the control information, the configuration module 112 further includes a mapping module configured to map first services mapped to a same GCL time gate to a same QoS flow, and one QoS flow is mapped to a same DRB at the air interface.

In a possible embodiment of the present disclosure, when configuring the preconfigured resource for the air interface for the terminal in accordance with the control information, the configuration module 112 is further configured to perform one of: determining a time-domain position where the preconfigured resource is allowed to occur in accordance with a start point and a length of a GCL time gate corresponding to a QoS flow or a DRB; determining the time-domain position where the preconfigured resource is allowed to occur in accordance with the start point and an end point of the GCL time gate corresponding to the QoS flow or the DRB; determining a period of the preconfigured resource in accordance with a GCL cycle time; determining a time-domain resource corresponding to the preconfigured resource in accordance with a data volume transmitted each time in the GCL time gate corresponding to the QoS flow or the DRB; or determining a frequency-domain resource corresponding to the preconfigured resource in accordance with the data volume transmitted each time in the GCL time gate corresponding to the QoS flow or the DRB.

In a possible embodiment of the present disclosure, the configuration module 112 includes a first configuration unit configured to configure at least one set of preconfigured resources for the terminal with respect to each GCL time gate, and the set of preconfigured resources is a set of physical resources occupying a same frequency-domain position and occurring repeatedly at a time domain in accordance with a predetermined period.

The first configuration unit is further configured to configure the preconfigured resources for the terminal through RRC signaling, and the RRC signaling carries at least one of an index number of each preconfigured resource, a period of each preconfigured resource, a time-domain position of each preconfigured resource, a frequency-domain position of each preconfigured resource, or an RNTI corresponding to each preconfigured resource.

To be specific, when there is more than one set of preconfigured resources, the RRC signaling further carries at least one of the quantity of times for which the preconfigured resource is repeated, a time offset parameter for each repetition, or a frequency-domain offset parameter for each repetition.

The first configuration unit is further configured to configure the preconfigured resources through RRC signaling, and activate and/or deactivate the preconfigured resources through PDCCH signaling, the RRC signaling carries at least one of an index number of each preconfigured resource, a period of each preconfigured resource, and an RNTI corresponding to each preconfigured resource, and the PDCCH signaling carries at least one of the index number of each preconfigured resource, a time-domain position of each preconfigured resource, or a frequency-domain position of each preconfigured resource.

To be specific, when there is more than one set of preconfigured resources, the RRC signaling or the PDCCH signaling further carries at least one of the quantity of times for which the preconfigured resource is repeated, a time offset parameter for each repetition, or a frequency-domain offset parameter for each repetition.

In a possible embodiment of the present disclosure, the configuration module 112 includes a second configuration unit configured to configure a logical channel prioritization restriction parameter corresponding to a logic channel for the terminal through RRC signaling, and the logical channel prioritization restriction parameter at least includes at least one of an index number of the preconfigured resource, a GCL time gate, or a GCL cycle time.

It should be appreciated that, the embodiments involving the network device correspond to the above-mentioned method embodiments, and the implementation modes in the method embodiments are adapted to the embodiments involving the network device, with a same technical effect.

Figure 12:
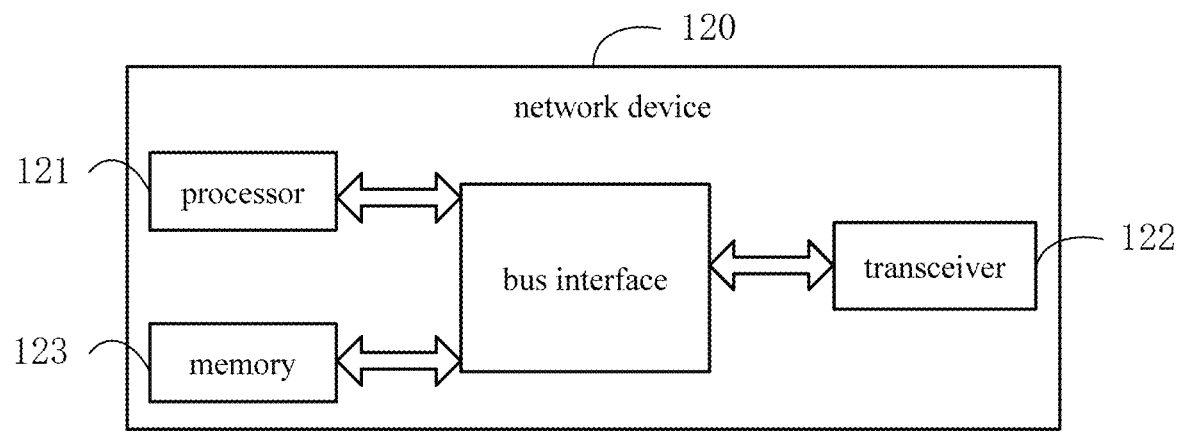
FIG. 12 is a structural view of the network device according to one embodiment of the present disclosure.

As shown in FIG. 12, the present disclosure further provides in some embodiments a network device 120, which includes a processor 121, a transceiver 122, a memory 123, and a computer program stored in the memory 123 and executed by the processor 121. The transceiver 122 is coupled to the processor 121 and the memory 123 via a bus interface. The processor 121 is configured to read the computer program in the memory, so as to: obtain a control information about a GCL; and configure a preconfigured resource for an air interface for a terminal in accordance with the control information.

It should be appreciated that, in FIG. 12, bus architecture includes a number of buses and bridges connected to each other, so as to connect various circuits for one or more processors 121 and one or more memories 123. In addition, as is known in the art, the bus architecture is used to connect any other circuits, such as a circuit for a peripheral device, a circuit for a voltage stabilizer and a power management circuit. The bus interface is provided, and the transceiver 122 consists of a plurality of elements, i.e., a transmitter and a receiver for communication with any other devices over a transmission medium. With respect to different terminals, the processor 121 takes charge of managing the bus architecture as well as general processings, and the memory 123 stores therein data for the operation of the processor 121.

In a possible embodiment of the present disclosure, the processor is configured to execute the computer program so as to perform one of: obtaining the control information about the GCL corresponding to a QoS flow or a DRB through CNC; and obtaining the control information about the GCL carried in a QoS parameter corresponding to the QoS flow or the DRB.

To be specific, the control information includes at least one of: a start point and a length of a GCL time gate corresponding to the QoS flow or the DRB; a start point and an end point of the GCL time gate corresponding to the QoS flow or the DRB; a cycle time of the GCL time gate; or a data volume transmitted each time in the GCL time gate corresponding to the QoS flow or the DRB.

In a possible embodiment of the present disclosure, the processor is further configured to execute the computer program, so as to map first services mapped to a same GCL time gate to a same QoS flow, and one QoS flow is mapped to a same DRB at the air interface.

In a possible embodiment of the present disclosure, the processor is further configured to execute the computer program, so as to perform one of: determining a time-domain position where the preconfigured resource is allowed to occur in accordance with a start point and a length of a GCL time gate corresponding to a QoS flow or a DRB; determining the time-domain position where the preconfigured resource is allowed to occur in accordance with the start point and an end point of the GCL time gate corresponding to the QoS flow or the DRB; determining a period of the preconfigured resource in accordance with a GCL cycle time; determining a time-domain resource corresponding to the preconfigured resource in accordance with a data volume transmitted each time in the GCL time gate corresponding to the QoS flow or the DRB; or determining a frequency-domain resource corresponding to the preconfigured resource in accordance with the data volume transmitted each time in the GCL time gate corresponding to the QoS flow or the DRB.

In a possible embodiment of the present disclosure, the processor is further configured to execute the computer program, so as to configure at least one set of preconfigured resources for the terminal with respect to each GCL time gate, and the set of preconfigured resources is a set of physical resources occupying a same frequency-domain position and occurring repeatedly at a time domain in accordance with a predetermined period.

The processor is further configured to execute the computer program, so as to configure the preconfigured resources for the terminal through RRC signaling, and the RRC signaling carries at least one of an index number of each preconfigured resource, a period of each preconfigured resource, a time-domain position of each preconfigured resource, a frequency-domain position of each preconfigured resource, or an RNTI corresponding to each preconfigured resource.

To be specific, when there is more than one set of preconfigured resources, the RRC signaling further carries at least one of the quantity of times for which the preconfigured resource is repeated, a time offset parameter for each repetition, or a frequency-domain offset parameter for each repetition.

The processor is further configured to execute the computer program, so as to configure the preconfigured resources through RRC signaling, and activate and/or deactivate the preconfigured resources through PDCCH signaling, the RRC signaling carries at least one of an index number of each preconfigured resource, a period of each preconfigured resource, and an RNTI corresponding to each preconfigured resource, and the PDCCH signaling carries at least one of the index number of each preconfigured resource, a time-domain position of each preconfigured resource, or a frequency-domain position of each preconfigured resource.

To be specific, when there is more than one set of preconfigured resources, the RRC signaling or the PDCCH signaling further carries at least one of the quantity of times for which the preconfigured resource is repeated, a time offset parameter for each repetition, or a frequency-domain offset parameter for each repetition.

In a possible embodiment of the present disclosure, the processor is further configured to execute the computer program, so as to configure a logical channel prioritization restriction parameter corresponding to a logic channel for the terminal through RRC signaling, and the logical channel prioritization restriction parameter at least includes at least one of an index number of the preconfigured resource, a GCL time gate, or a GCL cycle time.

The network device is a Base Transceiver Station (BTS) in Global System of Mobile communication (GSM) or Code Division Multiple Access (CDMA), or a Node B (NB) in Wideband Code Division Multiple Access (WCDMA), or an Evolutional N ode B (eNB or eNodeB) in LTE, or a relay or an access point, or a Next Generation Node B (ng-NB), a Central Unit (CU) or a distributed Unit (DU) in a future 5G network, which will not be particularly defined herein.

The present disclosure further provides in some embodiments a computer-readable storage medium storing therein a computer program. The computer program is executed by a processor so as to implement the steps of the resource configuration method for the network device.

Figure 13:
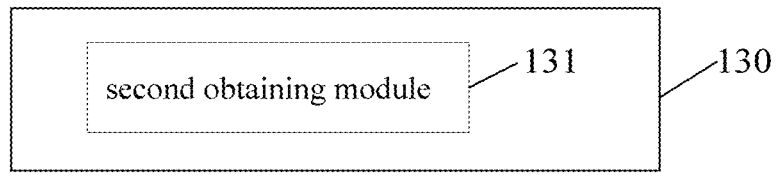
FIG. 13 is a schematic view showing modules of a terminal according to one embodiment of the present disclosure.

As shown in FIG. 13, the present disclosure provides in some embodiments a terminal 130, which includes a second obtaining module 131 configured to obtain a preconfigured resource for an air interface configured by a network device, and the preconfigured resource is configured by the network device in accordance with control information about a GCL.

In a possible embodiment of the present disclosure, the second obtaining module 131 is further configured to obtain a logical channel prioritization restriction parameter corresponding to a logic channel configured by the network device for the terminal through RRC signaling, and the logical channel prioritization restriction parameter at least includes at least one of an index number of the preconfigured resource, a GCL time gate, or a GCL cycle time.

In a possible embodiment of the present disclosure, the second obtaining module 131 includes a determination module configured to, subsequent to obtaining the logical channel prioritization restriction parameter corresponding to the logical channel configured by the network device for the terminal through the RRC signaling, determine a mapping between the logic channel and the preconfigured resource in accordance with the logical channel prioritization restriction parameter configured by the network device for the terminal.

It should be appreciated that, the embodiments involving the terminal correspond to the above-mentioned method embodiments, and the implementation modes in the method embodiments are adapted to the embodiments involving the terminal, with a same technical effect.

Figure 14:
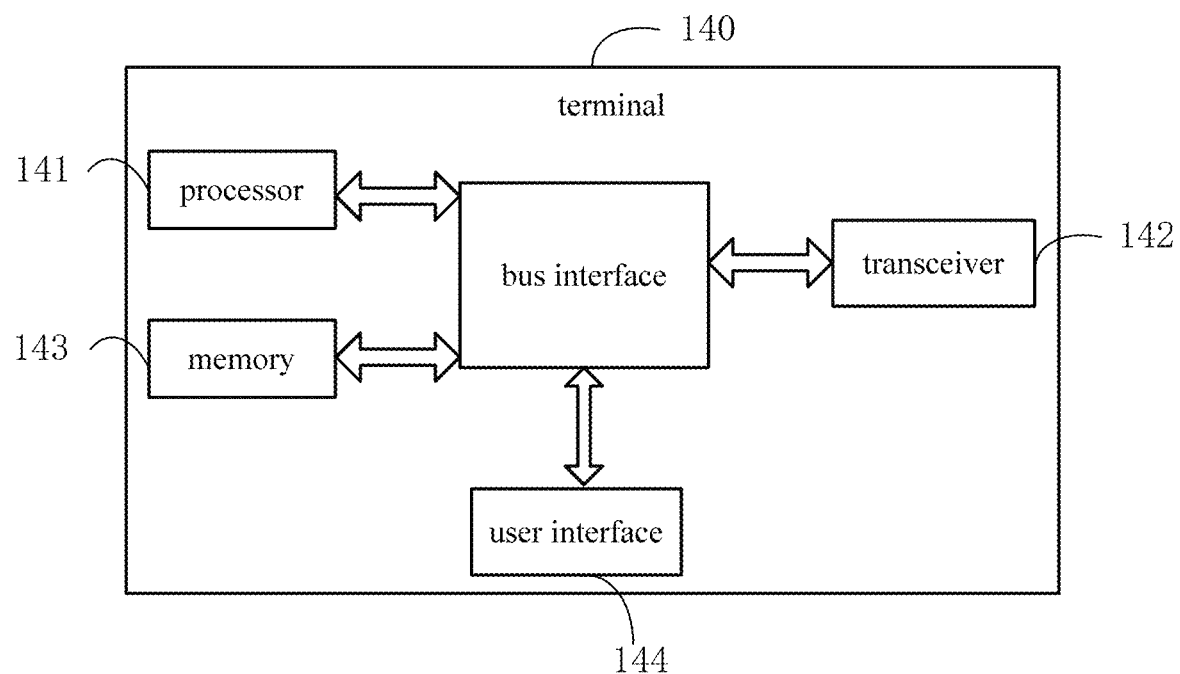
FIG. 14 is a structural view of the terminal according to one embodiment of the present disclosure.

As shown in FIG. 14, the present disclosure further provides in some embodiments a terminal 140, which includes a processor 141, a transceiver 142, a memory 143, and a computer program stored in the memory 143 and executed by the processor 141. The transceiver 142 is coupled to the processor 141 and the memory 143 via a bus interface. The processor 141 is configured to read a computer program stored in the memory, so as to obtain a preconfigured resource for an air interface configured by a network device. The preconfigured resource is configured by the network device in accordance with control information about a GCL.

It should be appreciated that, In FIG. 14, bus architecture includes a number of buses and bridges connected to each other, so as to connect various circuits for one or more processors 141 and one or more memories 143. In addition, as is known in the art, the bus architecture is used to connect any other circuits, such as a circuit for a peripheral device, a circuit for a voltage stabilizer and a power management circuit. The bus interface is provided, and the transceiver 142 consists of a plurality of elements, i.e., a transmitter and a receiver for communication with any other devices over a transmission medium. With respect to different terminals, a user interface 144 is also be provided for devices which are to be arranged inside or outside the terminal, and these devices include but not limited to a keypad, a display, a speaker, a microphone and a joystick. The processor 141 takes charge of managing the bus architecture as well as general processings, and the memory 143 stores therein data for the operation of the processor 141.

In a possible embodiment of the present disclosure, the processor is further configured to execute the computer program, so as to obtain a logical channel prioritization restriction parameter corresponding to a logic channel configured by the network device for the terminal through RRC signaling, and the logical channel prioritization restriction parameter at least includes at least one of an index number of the preconfigured resource, a GCL time gate, or a GCL cycle time.

In a possible embodiment of the present disclosure, the processor is further configured to execute the computer program, so as to determine a mapping between the logic channel and the preconfigured resource in accordance with the logical channel prioritization restriction parameter configured by the network device for the terminal.

The present disclosure further provides in some embodiments a computer-readable storage medium storing therein a computer program. The computer program is executed by a processor so as to implement the steps of the resource obtaining method for the terminal.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus are merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

In the case that the functional units are implemented in a software form and sold or used as a separate product, they are stored in a computer-readable medium. Based on this, the technical solutions of the present disclosure, partial or full, or parts of the technical solutions of the present disclosure contributing to the related art, appear in the form of software products, which are stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings are performed in a chronological order. Of course, some steps are also performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

It should be appreciated that, the embodiments of the present disclosure are implemented by hardware, software, firmware, middleware, microcode or a combination thereof. For the hardware implementation, the processor includes one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and executed by the processor. The memory is implemented inside or outside the processor.

Hence, the purposes of the present disclosure are also implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium is any known storage medium or a storage medium that occurs in future. It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings are performed in a chronological order. Of course, some steps are also performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource configuration method performed by a network device, the resource configuration method comprising:
obtaining a control information, the control information comprising a data volume transmitted each time in a time gate corresponding to a Quality of Service (QoS) flow or a Data Radio Bearer (DRB); and
configuring a preconfigured resource for an air interface for a terminal in accordance with the control information,
wherein the obtaining the control information comprises one of:
obtaining the control information corresponding to the QoS flow or the DRB through Centralized Network Configuration (CNC); or
obtaining the control information carried in a QoS parameter corresponding to the QoS flow or the DRB;
wherein the configuring the preconfigured resource for the air interface for the terminal in accordance with the control information comprises:
determining a time-domain resource corresponding to the preconfigured resource in accordance with the data volume transmitted each time in the time gate corresponding to the QoS flow or the DRB; or
determining a frequency-domain 1 resource corresponding to the preconfigured resource in accordance with the data volume transmitted each time in the time gate corresponding to the QoS flow or the DRB.

2. The resource configuration method according to claim 1, wherein the control information further comprises at least one of:
a start point and a length of the time gate corresponding to the QoS flow or the DRB;
a start point and an end point of the time gate corresponding to the QoS flow or the DRB; or
a cycle time of the time gate.

3. The resource configuration method according to claim 1, wherein prior to configuring the preconfigured resource for the air interface for the terminal in accordance with the control information, the resource configuration method further comprises mapping first services mapped to a same time gate to a same QoS flow, and one QoS flow is mapped to a same DRB at the air interface.

4. The resource configuration method according to claim 1, wherein the configuring the preconfigured resource for the air interface for the terminal in accordance with the control information further comprises one of:
determining a time-domain position where the preconfigured resource is allowed to occur in accordance with a start point and a length of the time gate corresponding to the QoS flow or the DRB;
determining the time-domain position where the preconfigured resource is allowed to occur in accordance with the start point and an end point of the time gate corresponding to the QoS flow or the DRB; or
determining a period of the preconfigured resource in accordance with a cycle time.

5. The resource configuration method according to claim 1, wherein the configuring the preconfigured resource for the air interface for the terminal in accordance with the control information comprises configuring at least one set of preconfigured resources for the terminal with respect to each time gate, and the set of preconfigured resources is a set of physical resources occupying a same frequency-domain position and occurring repeatedly at a time domain in accordance with a predetermined period.

6. The resource configuration method according to claim 5, wherein the configuring the at least one set of preconfigured resources for the terminal with respect to each time gate comprises configuring the preconfigured resources for the terminal through Radio Resource Control (RRC) signaling, and the RRC signaling carries at least one of an index number of each preconfigured resource, a period of each preconfigured resource, a time-domain position of each preconfigured resource, a frequency-domain position of each preconfigured resource, or a Radio Network Temporary Identifier (RNTI) corresponding to each preconfigured resource.

7. The resource configuration method according to claim 6, wherein when there is more than one set of preconfigured resources, the RRC signaling further carries at least one of: the quantity of times for which the preconfigured resource is repeated, a time offset parameter for each repetition, or a frequency-domain offset parameter for each repetition.

8. The resource configuration method according to claim 5, wherein the configuring the at least one set of preconfigured resources for the terminal with respect to each time gate comprises configuring the preconfigured resources through RRC signaling, and activating and/or deactivating the preconfigured resources through Physical Downlink Control Channel (PDCCH) signaling, the RRC signaling carries at least one of: an index number of each preconfigured resource, a period of each preconfigured resource, or an RNTI corresponding to each preconfigured resource, and the PDCCH signaling carries at least one of: the index number of each preconfigured resource, a time-domain position of each preconfigured resource, or a frequency-domain position of each preconfigured resource.

9. The resource configuration method according to claim 8, wherein when there is more than one set of preconfigured resources, the RRC signaling or the PDCCH signaling further carries at least one of the quantity of times for which the preconfigured resource is repeated, a time offset parameter for each repetition, or a frequency-domain offset parameter for each repetition.

10. The resource configuration method according to claim 1, wherein the configuring the preconfigured resource for the air interface for the terminal in accordance with the control information comprises configuring a logical channel prioritization restriction parameter corresponding to a logic channel for the terminal through RRC signaling, and the logical channel prioritization restriction parameter at least comprises at least one of: an index number of the preconfigured resource, a time gate, or a cycle time.

11. A resource obtaining method performed by a terminal, the resource obtaining method comprising:
obtaining a preconfigured resource for an air interface configured by a network device,
wherein the preconfigured resource is configured by the network device in accordance with control information, the control information comprising a data volume transmitted each time in a time gate corresponding to a Quality of Service (QOS) flow or a Data Radio Bearer (DRB),
wherein the control information is obtained by the network device in one of following manners:
the control information corresponding to the QoS flow or the DRB is obtained through Centralized Network Configuration (CNC); or the control information is carried in a QoS parameter corresponding to the QoS flow or the DRB;
wherein a time-domain resource corresponding to the preconfigured resource is determined by the network device in accordance with the data volume transmitted each time in the time gate corresponding to the QOS flow or the DRB; or
wherein a frequency-domain resource corresponding to the preconfigured resource is determined by the network device in accordance with the data volume transmitted each time in the time gate corresponding to the QoS flow or the DRB.

12. The resource obtaining method according to claim 11, wherein the obtaining the preconfigured resource for the air interface configured by the network device comprises obtaining a logical channel prioritization restriction parameter corresponding to a logic channel configured by the network device for the terminal through Radio Resource Control (RRC) signaling, and the logical channel prioritization restriction parameter at least comprises at least one of an index number of the preconfigured resource, a time gate, or a cycle time.

13. The resource obtaining method according to claim 12, wherein subsequent to obtaining the logical channel prioritization restriction parameter corresponding to the logic channel configured by the network device for the terminal through the RRC signaling, the resource obtaining method further comprises determining a mapping between the logic channel and the preconfigured resource in accordance with the logical channel prioritization restriction parameter configured by the network device for the terminal.

14. A terminal, comprising a memory, a processor, and a computer program stored in the memory and executed by the processor, wherein the processor is configured to execute the computer program so as to realize the resource obtaining method for the terminal according to claim 11.

15. A network device, comprising a memory, a processor, and a computer program stored in the memory and executed by the processor, wherein the processor is configured to execute the computer program so as to:
obtain a control information, the control information comprising a data volume transmitted each time in a time gate corresponding to a Quality of Service (QOS) flow or a Data Radio Bearer (DRB); and
configure a preconfigured resource for an air interface for a terminal in accordance with the control information,
wherein the processor is further configured to execute the computer program, so as to perform:
obtaining the control information corresponding to the QoS flow or the DRB through Centralized Network Configuration (CNC); or
obtaining the control information carried in a QoS parameter corresponding to the QoS flow or the DRB;
wherein the processor is further configured to execute the computer program, so as to perform:
determining a time-domain resource corresponding to the preconfigured resource in accordance with the data volume transmitted each time in the time gate corresponding to the QOS flow or the DRB; or
determining a frequency-domain resource corresponding to the preconfigured resource in accordance with the data volume transmitted each time in the time gate corresponding to the QoS flow or the DRB.

16. The network device according to claim 15, wherein the control information further comprises at least one of:
a start point and a length of a time gate corresponding to the QoS flow or the DRB;
a start point and an end point of the time gate corresponding to the QoS flow or the DRB; or
a cycle time of the time gate.

17. The network device according to claim 15, wherein the processor is further configured to execute the computer program, so as to map first services mapped to a same time gate to a same QoS flow, and one QoS flow is mapped to a same DRB at the air interface.

18. The network device according to claim 15, wherein the processor is further configured to execute the computer program, so as to further perform one of:
determining a time-domain position where the preconfigured resource is allowed to occur in accordance with a start point and a length of the time gate corresponding to the QoS flow or the DRB;
determining the time-domain position where the preconfigured resource is allowed to occur in accordance with the start point and an end point of the time gate corresponding to the QoS flow or the DRB; or
determining a period of the preconfigured resource in accordance with a cycle time.

* * * * *